Nov. 23, 1954  R. B. BLIZARD  2,695,199
BEARING

Filed Oct. 27, 1947  4 Sheets-Sheet 1

INVENTOR
ROBERT B. BLIZARD
BY
Herbert V. Thompson
HIS ATTORNEY

Nov. 23, 1954  R. B. BLIZARD  2,695,199
BEARING

Filed Oct. 27, 1947  4 Sheets-Sheet 2

INVENTOR.
ROBERT B. BLIZARD
BY
Herbert H. Thompson
HIS ATTORNEY

Nov. 23, 1954  R. B. BLIZARD  2,695,199
BEARING
Filed Oct. 27, 1947  4 Sheets-Sheet 3

INVENTOR
ROBERT B. BLIZARD
BY
HIS ATTORNEY

Nov. 23, 1954  R. B. BLIZARD  2,695,199
BEARING

Filed Oct. 27, 1947  4 Sheets-Sheet 4

INVENTOR
Robert B. Blizard
BY
HIS ATTORNEY

United States Patent Office 2,695,199
Patented Nov. 23, 1954

2,695,199

BEARING

Robert B. Blizard, Garden City, N. Y., assignor to The Sperry Corporation, a corporation of Delaware Application October 27, 1947, Serial No. 782,358

21 Claims. (Cl. 308—9)

This invention relates to bearings to which a lubricant is applied under pressure in such a fashion that relative motion of the parts of the bearing is not necessary to maintain effective lubrication. Therefore, my invention has particular application to bearings in which little relative motion normally occurs and in which friction must be kept very low regardless of the relative velocity of the two parts of the bearing. Because of its low density and viscosity, air has been proposed as the lubricant for this type of bearing, as shown for instance in the prior patents to Bolster, No. 2,263,232, dated November 18, 1941 and Braddon, No. 2,295,254, dated September 8, 1942 for Air Borne Gyro-Compasses. Such bearings are well adapted for providing the necessary degrees of freedom for gyroscopes.

My invention, however, is not limited to the art of gyroscopes nor to using air as a lubricant, since other fluids may be used including both liquids and other gases as will be apparent from the following specification. In the past, such bearings generally consisted of closely fitting spherical surfaces between which a lubricant is forced from a single hole in one of the parts. Consequently if the bearing was tipped on one side or turned upside down or subjected to severe sidewise or downward accelerations, such as may occur in an airplane or on shipboard, it was found necessary to make the bearing in two or more opposed parts to prevent the supported part from falling out.

The disadvantages of making the bearing in two parts are, increased complication of assembly and servicing and the extreme difficulty of aligning the two parts with the required accuracy. Another disadvantage of the prior art bearing using air, a compressible lubricant, was that only a small sidewise force is required to bring the two parts of the bearing into contact, the air being squeezed out on the pressure side and flowing around to the slack side, thereby destroying the freedom of support.

The present invention is closely related to and supplements that covered in the copending application of Richard G. Brugger, No. 761,281, filed July 16, 1947 for Air Bearings, which discloses and claims a means for introducing a lubricant under pressure from a plurality of pressure reducing orifices within pressure pockets located in one or more zones around the bearing, and by which the second of the above-mentioned disadvantages is avoided.

According to my invention, I provide in addition to the pressure zone or zones, a suction zone or zones, the pressure zones supporting the bearing and the suction holding the supported element firmly against the supporting element thus eliminating the necessity for any additional or supplemental bearing. This suction arrangement, when properly designed, cooperates with the aforesaid pressure orifices to produce a stable bearing which may be turned upside down or subjected to severe accelerations without permitting the sphere or other supported bearing part to be dislodged from its supporting cup.

Preferably, the aforesaid pressure orifices are symmetrically situated in the zone between the top and bottom of the supporting cup providing a ring around the supported sphere situated between the bottom pole and the equator of the sphere. Preferably, the suction zone which I provide in the bottom of the cup has an outlet from which lubricant is withdrawn by a suction pump. A single recirculating pump may be used to provide both the positive and negative pressure lubricant supplied. If, however, escaping lubricant is collected from parts other than the suction pocket there should be a restriction between the pump and such escape point.

My improved bearing may be completely immersed in the lubricant, but this is not necessary since a scavenging groove may be provided near the top of the bearing (or wherever the lubricant emerges) to collect the lubricant which does not go into the suction zone and this groove may be connected through the aforesaid restriction or limited orifice to the suction side of the pump. A scavenging groove may be desirable even in a completely immersed bearing such as an air bearing, to keep the emergent lubricant from exerting torques on the supported element.

One advantage of complete emersion is the absence of surface tension effects. Another is the possibility of floating the supported element in the liquid lubricant, so that only a small part of the weight is supported by the bearing. Floatation will also assist in opposing acceleration forces and the bearing will provide exact positioning of the supported element. This combination of floatation and fluid flow bearing support may be used even where very large accelerations are encountered. If the weight of the supported element is exactly balanced by floatation then either a combination of suction and pressure or a bearing made in two pieces (or two opposed bearings) should be used to keep the supported element in the bearing. While floatation bearings have heretofore been proposed, their combination with my improved bearing provides a novel and improved means for maintaining the exact positioning of the supported element.

Referring to the drawings in which several forms of my invention are shown,

Figure 1:
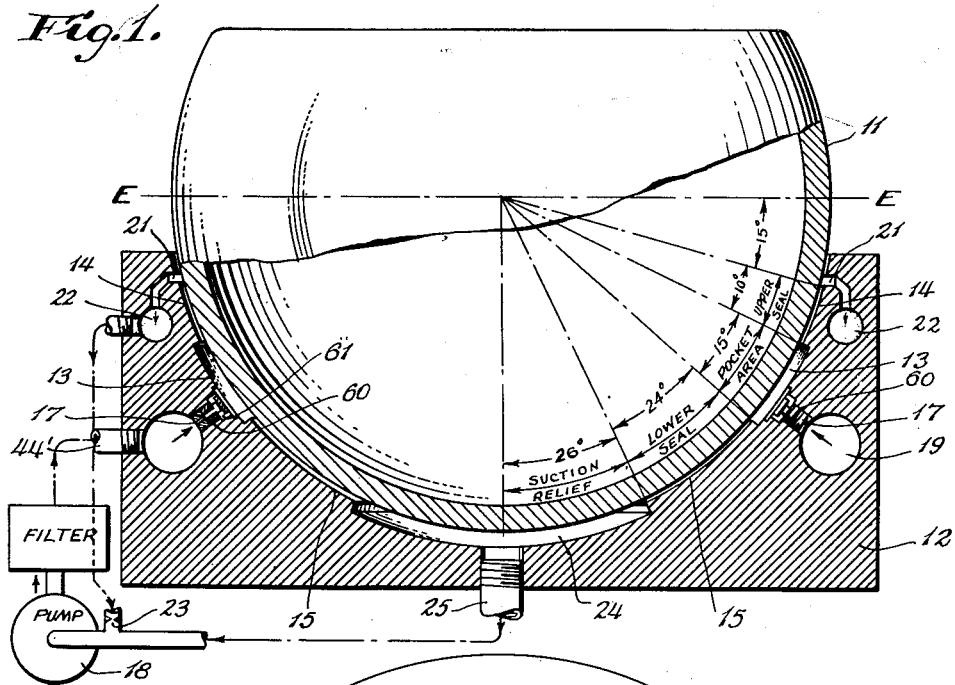
Fig. 1 is a vertical section through my improved bearing here shown as a universal bearing in a spherical form.
Figure 2:
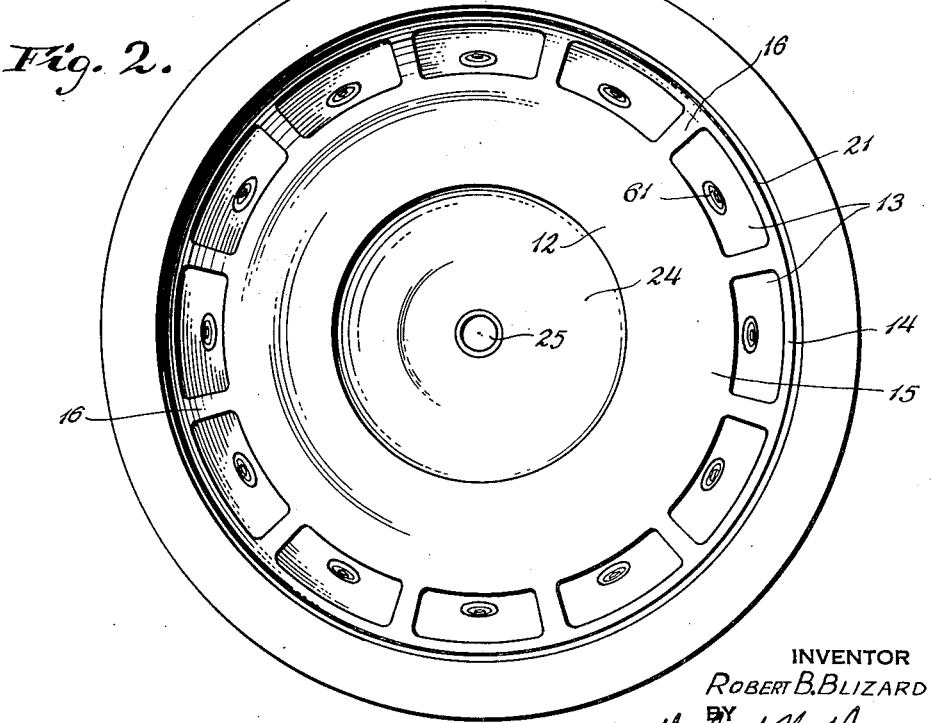
Fig. 2 is a plan view of the cup or bowl-shaped part of the bearing.

In Figs. 1 and 2 the supported or sensitive element 11 is shown as a hollow sphere floated with three degrees of freedom on a bearing provided by the cup-shaped support 12. The sphere 11 may contain any sensitive device desired, such as one or more gyroscopes, a magnetic needle or a combination of the two, but since the invention is not directed to the supported elements, none are shown in Fig. 1. The supporting cup 12 is shown as provided with a plurality of symmetrically placed shallow pockets or slight recesses 13 distributed around a latitude circle in the cup and separated from the upper edge and bottom pole of the cup by annular zones or seals 14 and 15 and from each other by radial seals 16. This circle or "parallel" of pockets preferably is at a substantial angle from both the equator E of the cup and the bottom pole, the exact angle being determined by the comparative amount of lateral and vertical support desired. Angles between 15 degrees and 60 degrees below the equator have been used with success, the angle to the upper edge of the pockets being shown in Fig. 1 as 25 degrees.

A pressure reducing fitting or outlet 60 having a restriction 17 therein is provided for leading the lubricant into the bottom of each recess 13 through annular channel 61. Each such outlet is connected to a source of pressure, such as pump 18. As shown, the output of the pump is connected through pipe 44' to a circular passage 19 around the interior of the cup, which is connected through outlet 60 to each recess. A preferred form of outlet and pocket is shown in the aforesaid application of R. G. Brugger.

After entering the pockets the lubricant passes in both directions between the sphere and the cup across the angular seals 14 and 15 which provide a suitable small clearance between the cup and the sphere. The part of the lubricant escaping upward through seal 14 passes into the scavenging groove 21 at the top of the cup whence it is drawn through the annular passage 22 and the limiting orifice 23 into the intake of the pump 18. The lubricant which flows downward through the seal 15 escapes into a recess 24 at the bottom of the cup whence it is drawn through the pipe 25 directly into the intake of pump 18. The scavenging groove 21 is essentially at atmospheric pressure and the flow through the orifice 23 creates a pressure drop so that the pressure in pipe 25 and recess 24 is below that of the atmosphere. This suction in recess 24 is utilized to hold the sphere in the cup against upward acceleration forces. If the sphere is completely immersed in the lubricant, (which it would be if air were employed as such lubricant) the scavenging groove may be omitted. The lubricant then passes from the upper seal 14 directly into the body of lubricant outside the bearing whence it is drawn through the orifice 23 into the intake to the pump as before. As an alternative to the orifice 23, separate pumps may be employed if desired, one for pressure and the other for suction.

Figure 9:
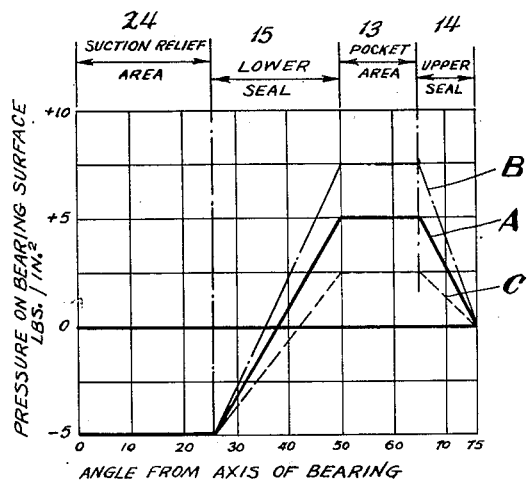
Fig. 9 is a diagram showing roughly the distribution of pressure of the cup and sphere of Fig. 1 under different conditions of loading.

The pump 18 and the limiting orifices 17 and 23 are so designed that when the supported sphere is in its normal position in the cup 12, the pressure in each recess or pocket 13 is roughly half-way between atmospheric pressure and the pressure furnished by the pump 18 and present in passage 19, and the pressure in the suction recess 24 is about as much below atmospheric pressure as that in the recess 13 is above such pressure. The solid line A of Fig. 9 shows a possible distribution of pressure within the bearing. The forces on the sphere due to the positive pressure are balanced with the negative pressure and with the weight of the sphere. If now a force is exerted on the sphere tending to push it down into the support and decrease the clearances at seals 14, 15 and 16, then this decrease in clearance restricts the flow of lubricant out of the pockets thereby decreasing the pressure drop across orifice 17 and increasing the pressure in the pockets and seal areas. At the same time the suction in suction pocket 24 will remain about the same, so that the new pressure distribution may be as shown by curve B in Fig. 9. The decrease of the seal clearances will continue until the increase in pressure of the bearing balances with the downward force of the sphere. Similarly, if an upward force is applied to the sphere, the clearances will increase and the pressure in the pressure pockets will decrease (curve C of Fig. 10) until the upward force is balanced by the decrease in pressure. A lateral force on the sphere will increase the clearance (and decrease the pressure) on one side and do the opposite on the other side until the pressure difference balances the force. Thus any force of magnitude less than the maximum force for which the bearing is designed will displace the sphere until clearances have changed enough to produce pressure changes to balance the applied force.

It will be understood, of course, that the displacements above are in reality quite small so that only microscopic shifts of position in the sphere take place.

It will be understood, of course, that the figures given for the angles and pressures in Figs. 1 and 9 are by way of example only, and that such figures may be varied widely within the scope of my invention.

Figure 3:
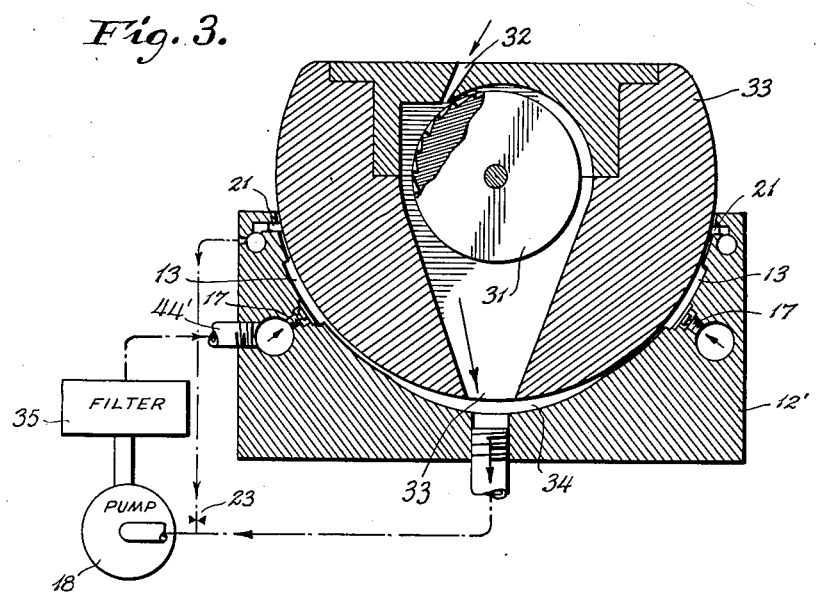
Fig. 3 is a vertical section showing how the supply of lubricant for my bearing may also be used for other purposes within the supported element, such as for spinning a gyro rotor.

My improved bearing readily lends itself to the supplying of the flow of lubricant for additional purposes within the supported member without any flexible connections or sealed joints. Thus in Fig. 3, I have shown how my bearing may be readily adapted to furnishing a power supply for spinning a gyro rotor represented diagrammatically at 31 by means of an air jet 32 (where air is used as a lubricant). The air jet 32 is shown as supplied with air at atmospheric pressure, air being drawn into the interior of the spherical casing 33 surrounding the rotor through jet 32 and thence downward through an aperture 33 in the bottom of the sphere leading within the recessed portion 34 at the bottom of the cup 12. The pump is provided with a sufficient capacity not only to draw air through the sphere in this manner, but also to create the necessary suction between the sphere and cup to prevent upward displacement. Preferably an air filter 35 is placed in the recirculating air system to remove dust and the like which is likely to affect the operation of the bearing.

Figure 4:
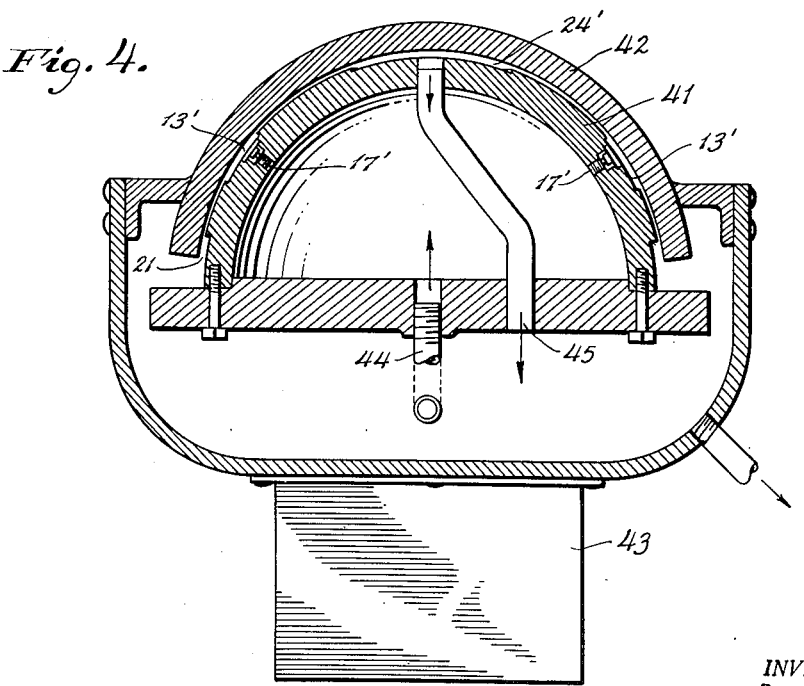
Fig. 4 shows a modified form of bearing in which the cup and sphere are reversed in the roles they play in Figs. 1–3.

An inverted type of spherical bearing is shown in Fig. 4. In this form the supporting surface 41 is in the form of a dome or hollow sphere, while the supported member 42 is in the form of a cup resting on the top of the spherical surface. The instrument to be supported, is represented as enclosed in a box 43 suspended from the cup 42. It will be understood, of course, that the supporting element in all figures may be gimballed if desired, by the usual gimbal supports as shown in the aforesaid patents to Bolster and Braddon.

In Fig. 4 the suction recess 24' is shown as on top of the supporting sphere, while the recesses 13' are symmetrically placed around a parallel about 30 degrees above the equator. To supply the orifices 17' with lubricant under pressure, lubricant is shown as introduced into the hollow spherical support through a pipe 44 leading to a pump (not shown). Lubricant is extracted from the suction recess 24' through a second pipe 45.

My invention is, of course, not limited to a spherical type of bearing, but other types may be adopted, especially where freedom is desired only about one axis, such as a vertical axis.

Figure 5:
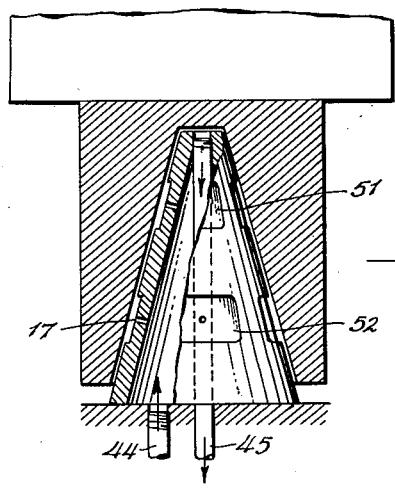
Fig. 5 is a vertical section of another form of my improved bearing modified to provide a single degree of freedom only, such as about the vertical axis.

Fig. 5 shows a similar improved bearing of a conical shape. The suction area in Fig. 5 is shown as of the same area as that of the exhaust pipe 45 as it is obvious that the pipe may be as large as this area if it is desired.

Figure 6:
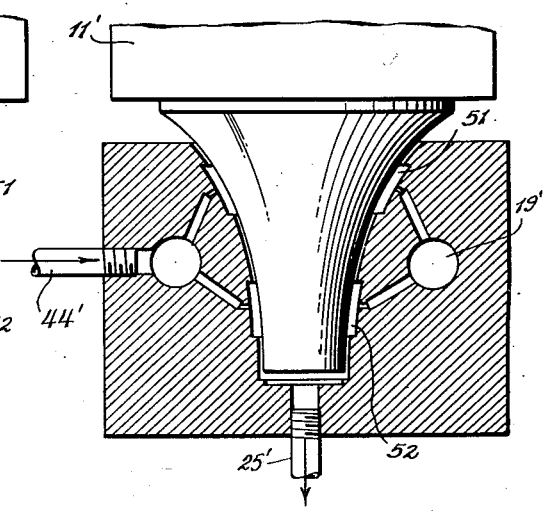
Fig. 6 is a similar view showing a conoidal form of bearing.

In Fig. 6 the surfaces of revolution are shown in the form of truncated conoids with two groups of pressure pockets 51 and 52 as is also the case in Fig. 5. In Fig. 6, however, the upper group of pockets 51 will support the main downward thrust of the supported element 11' while the lower group of pockets 52 will act mainly as guide bearings in conjunction with the pockets 51.

The function of the pockets around the pressure and suction openings in all forms of my invention described, is to decrease the resistance to flow in these regions in order to get a better distribution of pressure in the bearings, but such construction while preferable is not essential to the successful operation of my invention.

Figure 7:
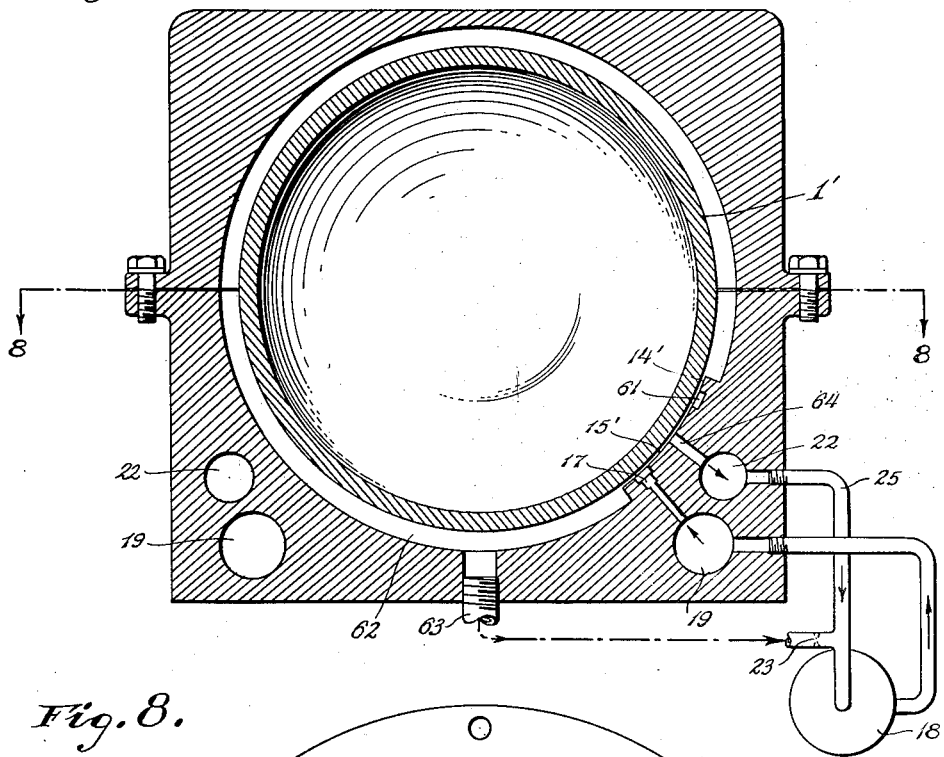
Fig. 7 is a vertical section on line 7—7 in Fig. 8 through the spherical bearing in which the bearing arrangement is divided into three parts or zones, each part being supplied with both pressure and suction.
Figure 8:
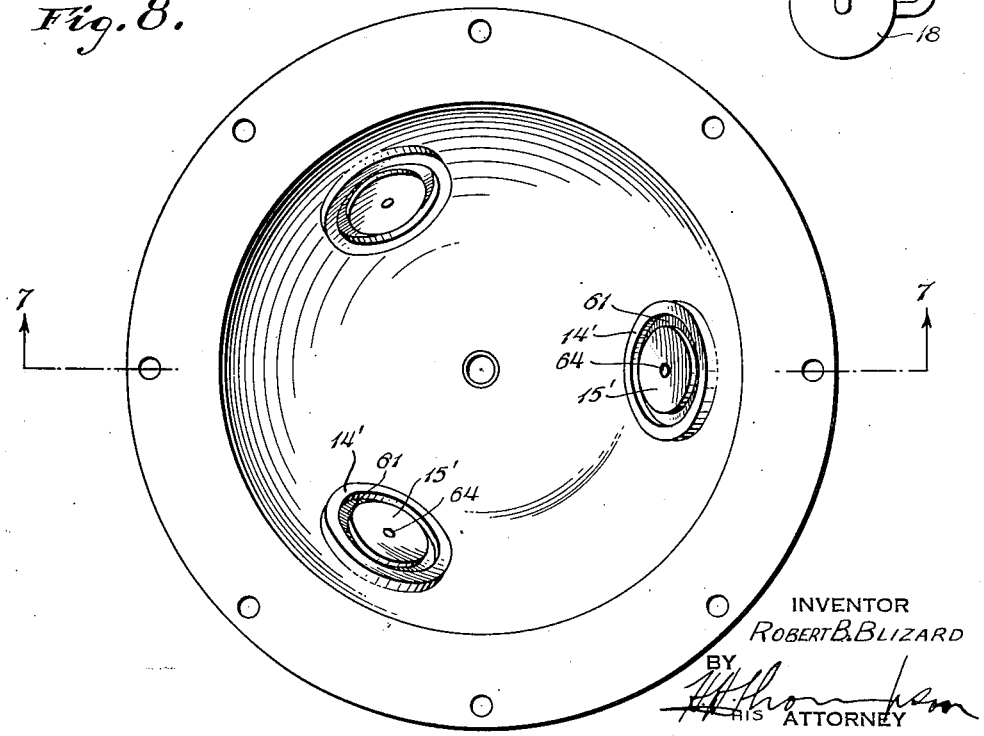
Fig. 8 is a plan view of the lower half of this bearing; (see line 8—8 in Fig. 7)

It is also not necessary that the bearing surfaces be continuous. Figs. 7 and 8 show a spherical bearing in which the supported bearing surface has been divided into three similar parts or zones, Fig. 8 being a top view of the supporting member and Fig. 7 a section through the bearing on line 7—7 in Fig. 8. The operation is similar to that of the bearings in Figs. 1 and 2. Lubricant is supplied under pressure by the pump 18 to the annular passage 19 whence it passes through orifices 17 into the circular groove 61 in the bearing surfaces. It then flows over the annular seal areas 14', into the scavenging space 62, thence through the connecting tube 63 and the pressure reducing orifice 23 into the intake of pump 18. It also flows over the annular seal areas 15' into the suction openings 64 which communicate with the annular passage 22 and through the tube 25 to the intake of pump 18. Thus the pressure in the neighborhood of suction holes 64 is below that in the space 62 so that a relatively constant suction is available to keep the supported sphere 1' from moving away from the bearing surfaces. As in the bearings described above, when the clearance between the sphere 1' and one of the seal areas 14', 15' decreases, the pressure drop in the orifice 17 decreases, increasing the average pressure over the bearing surface, thus producing a force to oppose that tending to decrease the clearance. If the clearance is increased, the opposite result takes place. With the bearing surfaces in three parts or zones as shown, the sphere is held against movement in any direction, although each part of the bearing surface exerts its force primarily in a direction perpendicular to the surface. If a liquid lubricant is used, filling the space 62, the weight of the supported sphere can be balanced by the buoyancy of the fluid.

It is not necessary to have both pressure and suction applied to each part of the bearing surface. Three parts of the bearing surface could be supplied with pressure as in Figs. 7 and 8, and an additional part supplied with suction could be provided at the bottom as in Fig. 1. The principle of divided bearing surfaces is not restricted to spherical bearings, but can be applied to many other types of bearings.

Divided bearing surfaces can be used with particular advantage in combination with floatation of the supported element, since in this case the bearing forces are small and a small total bearing area may be used, thereby decreasing the friction.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

Thus while my invention is shown as applied to vertical bearings, it obviously is adapted for horizontal or inclined bearings as well, the conical shapes being well adapted for this purpose.

What is claimed is:

1. A bearing open at one side comprising interfitting surfaces, means for supplying lubricant under pressure between said surfaces at spaced regions, and suction means for withdrawing lubricant therefrom at a point opposite said open side and intermediate the points of introduction of said pressure lubricant.

2. An air bearing comprising interfitting surfaces on the supported and supporting elements normally separated by a film of flowing air, and the outer element at least having an open top, a plurality of spaced recesses and connected orifices in the surface of the supporting element, means for supplying air under pressure to each orifice, a pressure reducing device between each orifice and the supply of air whereby a decrease in the thickness of the film of air in the neighborhood of a given recess causes an increase of pressure in said recess, an additional centrally located recess in the surface of the supporting element of substantial area and means for withdrawing air therefrom at sub-atmospheric pressure to hold the two elements together.

3. A bearing comprising a supporting element in the form of a cup, a generally convex surface on the supported element resting in said cup, means for supplying lubricant between the surfaces at points above the bottom thereof, an opening at the bottom of the cup and means for withdrawing lubricant from said opening so as to reduce the pressure on the bottom of the convex surface.

4. In a bearing for supporting a sensitive element, a conelike member thereon, a supporting member with a generally conical cavity therein, openings in the surface of said cavity, means for supplying lubricant under pressure thereto, and means for withdrawing lubricant from the bottom of said cavity whereby said sensitive element is freely supported for rotation about a single axis and translation in any direction is prevented.

5. A universal bearing for freely supporting a sensitive element comprising a cup, a spherical surface on said element resting in said cup, means for introducing lubricant between the spherical surface and the cup at points above the bottom and below the top thereof, and means for withdrawing lubricant from the bottom of said cup.

6. An air bearing for a sensitive instrument comprising cooperating surfaces of revolution for freely supporting the sensitive element of the instrument by one bearing comprising a cup, a convex surface on said element resting in said cup, means for supplying air under pressure between the two surfaecs at points above the bottom of the cup, a pocket at the bottom of the cup and suction means for withdrawing air from said pocket to reduce the pressure on the bottom of the convex surface whereby said element is held within the bearing without a second bearing for resisting upward thrust.

7. An air bearing for a sensitive instrument comprising cooperating surfaces of revolution for freely supporting the sensitive element of the instrument by one bearing comprising a cup, a spherical surface on said element resting in said cup, a plurality of pockets symmetrically arranged around the surface of the cup at points between the top and bottom of the cup, means for supplying air under pressure thereto, an additional pocket at the bottom of the cup, and means for withdrawing air therefrom whereby said element is supported on a universal air bearing both vertically and laterally and is held against upward displacement without a second bearing.

8. An air bearing for freely supporting but preventing separation of a sensitive element from an open top supporting element, including complementary interfitting surfaces of revolution on the supported and supporting element, normally separated by a film of flowing air, spaced pockets in the surface of the supporting element, surrounded by the interfitting surfaces, means for supplying air under pressure within such pockets whereby the air escapes from the pockets between the surfaces of revolution to provide said air film, an additional central pocket in the surface of the supporting element and means for withdrawing air therefrom.

9. An air bearing for freely supporting but preventing separation of a sensitive element from an open top supporting element, including complementary interfitting surfaces of revolution on the supported and supporting element, normally separated by a film of flowing air, a pocket or depression in the surface of the supporting element, a source of air pressure for supplying air under pressure within said pocket, a pressure reducing device between said pocket and such source, whereby an increased bearing load at a pocket in decreasing the thickness of the supporting air film surrounding the pocket thereby causes increase in the pressure within and adjacent the pocket, an additional central pocket in the surface of the supporting element and means for withdrawing air therefrom to prevent separation of said surfaces.

10. An air bearing for a sensitive instrument comprising cooperating surfaces of revolution for freely supporting the sensitive element of the instrument by one bearing comprising a convex supporting surface, an inverted cup on said element resting on said convex surface, means for supplying air under pressure between the two surfaces at points above the bottom thereof, a pocket at the top of said convex surface and suction means for withdrawing air from said pocket to reduce the pressure on the top of the cup whereby said element is held within the bearing with no extra bearing resisting upward thrust.

11. An air bearing as claimed in claim 10 wherein the supporting areas of said pockets face in directions having both vertical and centralizing components whereby the supported element is air borne against both vertical and lateral pressures.

12. An air bearing for a sensitive instrument comprising cooperating surfaces of revolution for freely supporting the sensitive instrument by one bearing comprising a dome, a cup on said instrument resting on said dome, means for supplying air under pressure between the two surfaces at points above the bottom thereof, a pocket at the top of the dome and suction means for withdrawing air from said pocket to reduce the pressure on the bottom of the cup whereby said instrument is held within the bearing without a second bearing for resisting upward thrust.

13. An air bearing for a sensitive instrument comprising a hollow truncated cone-like supporting member, a cooperating member on the sensitive portion of the instrument having a generally conical cavity therein with a flattened top, a plurality of pockets in the exterior surface of said cone, means for supplying air under pressure within said hollow member and to said pockets and means for withdrawing air from the truncated surface of said cone to reduce the pressure on the top thereof, whereby the instrument is supported by a single air bearing against translation in any direction.

14. An air bearing for an instrument having a sensitive element, a truncated cone-like member thereon, a supporting member having a generally conical cavity therein with a flattened bottom, pockets in the surface of said cavity, means for supplying air under pressure thereto, and means for withdrawing air from the flat bottom of said cavity, whereby said element is freely supported for rotation about one axis and translation prevented in any direction.

15. In universally supported airborne gyroscopic apparatus, an outer cup, a hollow ball fitted therein, means for supplying air under pressure between said cup and ball at a plurality of points to float the ball on a flowing air film, suction means for withdrawing air from a region under the ball, said ball having an aperture in the bottom thereof of less area than said region, whereby air is also withdrawn from the interior of the ball, and means within the ball utilizing the flow of air toward said aperture.

16. A bearing comprising cooperating surfaces of revolution, a plurality of openings in one of the surfaces, means for supplying lubricant under pressure to said openings, suction means for withdrawing lubricant from between said surfaces, thereby creating a region of low pressure so as to resist separation of the surfaces, a scavenging zone for collecting used lubricant and a restriction between said zone and said suction means.

17. An air bearing for an instrument having a sensitive element comprising cooperating surfaces of revolution for freely supporting the sensitive element by one bearing, comprising a cup, a convex surface on said element resting in said cup, means for supplying air under pressure between the two surfaces at points above the bottom of the cup, a circular channel adjacent the top of the cup, a pocket at the bottom of the cup and suction means for withdrawing air from said pocket to reduce the pressure on the bottom of the convex surface whereby said element is held within the bearing without a second bearing for resisting upward thrust, and a restriction between said channel and said suction means whereby escaping air is withdrawn and torques avoided without materially lessening the suction.

18. An open sided bearing comprising cooperating surfaces of revolution, a plurality of spaced openings in one of the surfaces, means for supplying lubricant to said openings, a depression in said surface surrounding each opening, and means for withdrawing lubricant at subatmospheric pressure from between said surfaces at a point between said depressions and also opposite said open side, thereby creating a region of low pressure so as to resist separation of the surfaces.

19. An open top bearing comprising a surface of revolution on the supported element, an interfitting surface on the supporting element, at least one of said surfaces being divided into a plurality of recessed regions, means for supplying lubricant under pressure to said recessed regions and the surface of the supported element, and means for withdrawing lubricant from another recessed region between said first mentioned regions and also opposite said open top.

20. In an air bearing for freely supporting a sensitive element including complementary, interfitting spherical surfaces on the supported and supporting element, normally separated by a film of flowing air, spaced pockets in the surface of the supporting element, a source of air pressure for supplying air under pressure within each pocket, a pressure reducing device between each pocket and such source, whereby an increased bearing load at a pocket in decreasing the thickness of the supporting air film surrounding the pocket thereby causes increase in the pressure within and adjacent the pocket, an additional central pocket in the surface of the supporting element and suction means for withdrawing air therefrom.

21. A fluid bearing structure comprising a member having an outer spherical contour, a second member having an inner contour substantially concentric therewith, means for admitting fluid between the members at various points disposed in an annular zone, and means for withdrawing fluid from between the members at a point symmetrical with respect to the annular zone.

References Cited in the file of this patent

UNITED STATES PATENTS

| Number | Name | Date |
|---|---|---|
| 1,629,577 | Klahn | May 24, 1927 |
| 1,906,715 | Penick | May 2, 1933 |
| 2,049,343 | Warren | July 28, 1936 |
| 2,086,898 | Carter | July 13, 1937 |